US009322695B2

(12) United States Patent
Nicholls et al.

(10) Patent No.: US 9,322,695 B2
(45) Date of Patent: Apr. 26, 2016

(54) STATUS INDICATOR FOR AMONIA CARTRIDGE

(75) Inventors: David J. Nicholls, Naperville, IL (US); Jason B. Arriaga, Wheaton, IL (US); Jeffrey R. Kelso, Fort Wayne, IN (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 729 days.

(21) Appl. No.: 13/543,160

(22) Filed: Jul. 6, 2012

(65) Prior Publication Data

US 2013/0153652 A1 Jun. 20, 2013

Related U.S. Application Data

(63) Continuation-in-part of application No. PCT/US2011/049094, filed on Aug. 25, 2011.

(60) Provisional application No. 61/469,365, filed on Mar. 30, 2011.

(51) Int. Cl.
*G06F 17/00* (2006.01)
*G06K 19/06* (2006.01)
(Continued)

(52) U.S. Cl.
CPC ............ *G01F 23/0061* (2013.01); *C01C 1/003* (2013.01); *F01N 3/208* (2013.01); *F01N 11/00* (2013.01); *B01D 2251/2067* (2013.01);
(Continued)

(58) Field of Classification Search
CPC . G01F 23/00; G01F 23/0061; G01F 23/0069; F01N 2560/021; F01N 2560/05; F01N 2560/12; C01C 1/003

USPC ...................... 235/375, 492; 73/295
See application file for complete search history.

(56) References Cited

U.S. PATENT DOCUMENTS 6,467,888 B2 * 10/2002 Wheeler et al. ................. 347/85
8,834,603 B2 * 9/2014 Johannessen et al. ............ 95/15
(Continued)

FOREIGN PATENT DOCUMENTS

WO WO 2011/103968 A2 9/2011

OTHER PUBLICATIONS

The State Intellectual Property Office of the People's Republic of China Search Report Date of Dispatch Apr. 4, 2015 Application No. 201310394454.7.

*Primary Examiner* — Thien M Le
*Assistant Examiner* — April Taylor
(74) *Attorney, Agent, or Firm* — Mark C. Bach; Jeffrey P. Calfa

(57) ABSTRACT

Systems and methods for determining amount of solid ammonia stored in a canister used in providing ammonia fluid in exhaust gas after-treatment systems. A microcontroller sets an ammonia level based on the data read from an RFID tag associated with the canister. The data may provide the amount of solid ammonia stored in the canister or a tag number that the microcontroller may use to retrieve the quantity of stored solid ammonia. A measured amount of ammonia fluid used during the treatment process may be used by the microcontroller in determining the amount of solid ammonia depleted from the canister. At predetermined precisions, the amount of depleted ammonia is subtracted from the set ammonia level to determine the remaining amount of solid ammonia in the canister. This determined amount of may be used to reset the ammonia level and be written onto the RFID tag.

3 Claims, 7 Drawing Sheets

(51) Int. Cl.
*G01F 23/00* (2006.01)
*F01N 3/20* (2006.01)
*F01N 11/00* (2006.01)
*C01C 1/00* (2006.01)

(52) U.S. Cl.
CPC ......... *F01N2450/30* (2013.01); *F01N 2550/05* (2013.01); *F01N 2610/02* (2013.01); *F01N 2610/06* (2013.01); *F01N 2610/10* (2013.01); *F01N 2900/1812* (2013.01); *F01N 2900/1814* (2013.01); *Y02T 10/24* (2013.01); *Y02T 10/47* (2013.01)

(56) References Cited

U.S. PATENT DOCUMENTS

| | | | |
|---|---|---|---|
| 2003/0189188 A1* | 10/2003 | Frost | C01C 1/003 252/193 |
| 2006/0145880 A1* | 7/2006 | Chi et al. | 340/612 |
| 2012/0049852 A1* | 3/2012 | Widmann et al. | 324/427 |
| 2012/0072135 A1* | 3/2012 | Quaade | 702/55 |
| 2014/0107835 A1* | 4/2014 | Biasi et al. | 700/231 |

* cited by examiner

STATUS INDICATOR FOR AMONIA CARTRIDGE

RELATED APPLICATIONS

This application claims priority to, and is a continuation-in-part of, PCT Application No. PCT/US2011/049094, having an International filing date of Aug. 25, 2011, which is incorporated herein by reference, and also claims priority to U.S. Patent Application No. 61/469,365, having a filing date of Mar. 30, 2011, which is also incorporated herein by reference in its entirety.

TECHNICAL FIELD

One aspect of the present device and methods relate to status indicators for containers. More specifically, the device and methods relate to content status indicators, such as "full" or "empty" or "35% full" for ammonium cartridge canisters (or cartridges) used on internal combustion engines for exhaust gas after-treatment systems. Another aspect of the present device and methods relate to detecting and determining the amount of ammonia stored in, and during or after use, remaining in the canisters, and reading and writing that information on a radio frequency device associated with the canister.

BACKGROUND

Compression ignition engines provide advantages in fuel economy, but produce both $NO_x$ and particulates during normal operation. New and existing regulations continually challenge manufacturers to achieve good fuel economy and reduce the particulates and $NO_x$ emissions. Lean-burn engines achieve the fuel economy objective, but the high concentrations of oxygen in the exhaust of these engines yields significantly high concentrations of $NO_x$ as well. Accordingly, the use of $NO_x$ reducing exhaust treatment schemes is being employed in a growing number of systems.

One such system is the direct addition of ammonia gas to the exhaust stream. It is an advantage to deliver ammonia directly in the form of a gas, both for simplicity of the flow control system and for efficient mixing of reducing agent, ammonia, with the exhaust gas. The direct use of ammonia also eliminates potential difficulties related to blocking of the dosing system, which are cause by precipitation or impurities, e.g., in a liquid-based urea solution. In addition, an aqueous urea solution cannot be dosed at a low engine load since the temperature of the exhaust line would be too low for complete conversion of urea to ammonia (and $CO_2$).

Due to its caustic nature, transporting ammonia as a pressurized liquid can be hazardous if the container bursts, as the result of an accident, or if a valve or tube breaks. In the case of using a solid storage medium, the safety issues are much less critical since a small amount of heat is required to release the ammonia and the equilibrium pressure at room temperature can be—if a proper solid material is chosen—well below 1 bar. Solid ammonia can be provided in the form of disks or balls loaded into a cartridge or canister. The canisters are then loaded into a mantle or other storage device and secured to the vehicle for use. Appropriate heat is applied to the canisters, which then causes the ammonia-containing solid storage material to release ammonia gas into the exhaust system of a vehicle, for example.

However, eventually the ammonia in a canister is depleted and must be recharged or replaced. Unfortunately, there are no systems in place which indicate the fill-status of a canister. This short-coming requires a number of canisters to be used in a system to provide redundancy, and the canisters are typically changed on a regular basis to avoid the possibility of depletion during engine operation. The result is sometimes the carrying of an insufficient amount of ammonia to provide the desired redundancy, and sometimes the removal and replacement of partially-filled ammonia canisters with full canisters to avoid depletion. Such conditions and procedures may increase the possibility of an accidental ammonia release.

Thus, the present system and methods provide for fill-status indication on-board vehicles and on individual canisters. The system and methods facilitate proper scheduling of removal and replacement of ammonia canisters as well as providing real-time ammonia loads for canisters. These and other problems are addressed and resolved by the disclosed systems and method of the present application.

SUMMARY

Embodiments herein relate to a method for determining the level of solid ammonia in a canister. The method includes setting an ammonia level based on data read from a radio frequency identification device (RFID) tag. The method also includes measuring the amount of ammonia fluid transported from the canister is measured. The amount of solid ammonia depleted from the canister is determined using the measured amount of transported ammonia fluid. An amount of solid ammonia remaining in the canister after a predetermined amount of solid ammonia has been depleted from the canister is also determined. The method further includes re-setting the ammonia level and writing the reset ammonia level on the RFID tag.

Another embodiment relates to a method for determining the level of solid ammonia in a canister, which includes reading data from an RFID tag that indicates the amount of solid ammonia contained in the canister. The setting of an ammonia level is set based on data read from the RFID tag. Additionally, the method includes metering an amount of ammonia fluid transported from the canister to an ammonia injector. An amount of solid ammonia depleted from the canister is determined using the metered amount of ammonia fluid. Further, an amount of solid ammonia remaining in the canister is determined and written on the RFID tag.

Another embodiment relates to a solid ammonia canister detection system. The system includes a solid ammonium canister that has stored therein a supply of solid ammonium. The system also includes a RFID tag that is associated with the canister. An antenna is configured to receive data from, and transmit data to, the RFID tag. Additionally, a transceiver chip is configured to decode data received from, and code data sent to, the RFID tag. The system also includes a microcontroller that is configured to record data received from the radio frequency device. The microcontroller determines the quantity of solid ammonia that has been depleted from the canister. Further, the microcontroller determines the quantity of solid ammonia remaining in the canister based data from the RFID tag and the quantity of solid ammonia depleted from the canister.

BRIEF DESCRIPTION OF THE DRAWINGS

FIG. 6b illustrates a front view of a receptacle having protrusions that are configured to mate with the slotted outer housing of a first antenna shown in FIG. 6a.

DETAILED DESCRIPTION

Figure 1:
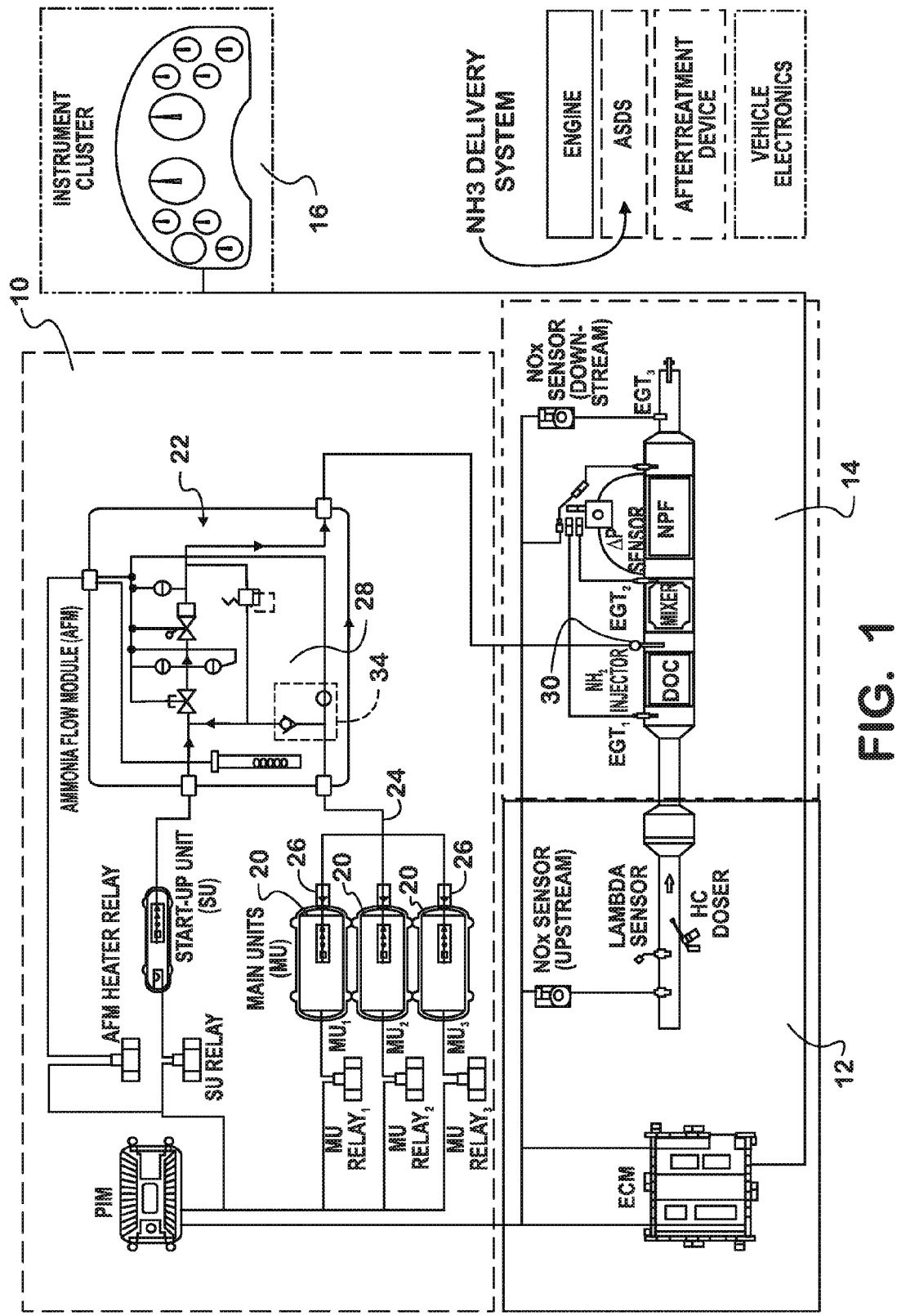
FIG. 1 is a schematic overview of an ammonia storage and delivery system working in conjunction with a vehicle engine system, exhaust gas after-treatment system and the vehicle electronics.
Figure 2:
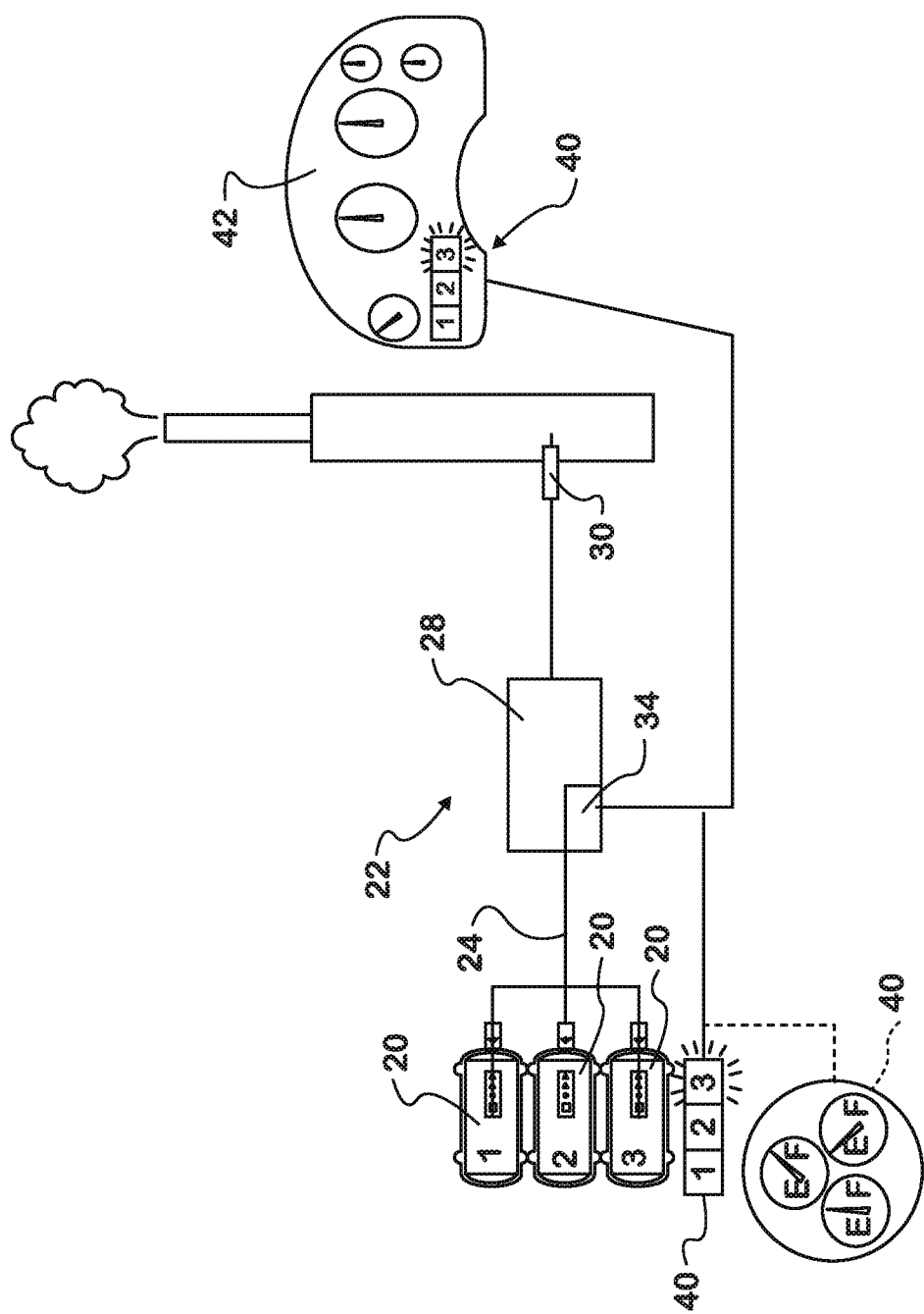
FIG. 2 is a schematic illustrating an embodiment of the present on-board fill-status indicator system.
Figure 3:
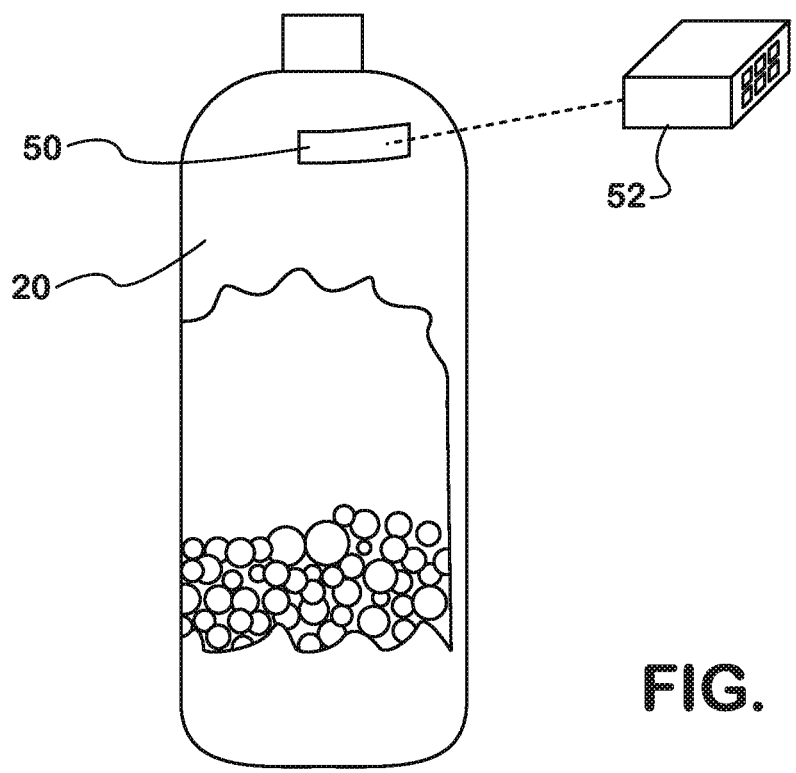
FIG. 3 is a schematic illustrating a partial cross-section of an ammonia canister and an embodiment of the present canister fill-status indicator system.

With reference to FIGS. 1-3, the embodiments of the system and methods are described. Generally speaking, an ammonia delivery system, designated with the reference number 10 in the figures, typically works in conjunction with an internal combustion engine 12, an exhaust gas after-treatment system 14, and vehicle electronics 16.

In an embodiment of the ammonia delivery system 10, a canister 20 containing a supply of ammonia in solid form is loaded into a carrier and secured in place. The canister 20 is connected to a metering system 22 via special tubing 24 and a special connector 26 to prevent leakage of the ammonia. In most systems, a plurality of canisters will be used to provide greater travel distance between recharging. However, the current system works sufficiently with a single canister, for some applications and as desired or necessary. A heating jacket (not shown) is typically used around the canister to bring the solid ammonia to a sublimation temperature.

Once converted to a gas, the ammonia is metered at the ammonia flow module (AFM) 28 and directed to an exhaust gas after-treatment system 14 having an ammonia injector 30, as shown in FIG. 1. The AFM 28 includes a controller 34 for metering flow of ammonia to the injector. By "metering" it is meant that the controller 34 controls ammonia flow (rate and duration) and stores information about such details including the amount of ammonia required by the exhaust gas after-treatment system 14, the amount of ammonia being delivered, the canister providing the ammonia, the starting volume of deliverable ammonia in the canister, and other such data which may be relevant to determining the amount of deliverable ammonia in each canister. The information may be monitored on a periodic or continuous basis. When the controller 34 determines that the amount of deliverable ammonia is below a predetermined level, a status indicator 40 electronically connected to the controller 34 is activated. Further, the predetermined level may be altered or adjusted, such as being calibrated, during operation of the system. The indicator 40 may be used to generally indicate a status of the canister 20, such as, for example, "Full" or "Empty" (see FIG. 4, for example), or it may be used to indicate a specific amount of remaining deliverable ammonia.

In an embodiment for indicating a general threshold level of ammonia, the status indicator is an LED or other such simple visual indicator capable of signifying two separate conditions (e.g., on and off). The predetermined threshold level may be "empty" or it may be, for example, when only 10% of deliverable ammonia remains. In a similar embodiment, the status indicator may include a series of LEDs (or other such visual indicators) to indicate ranges or a decreasing series of different threshold levels of deliverable ammonia remaining—e.g., 80%, 50%, 20%, etc. For more acute concerns, the status indicator may use an analog or digital display of remaining ammonia, much like a fuel gauge on a vehicle operates.

The visual indicator 40 may be mounted in proximity to the canister storage area to better advise those individuals charged with recharging and replacing empty canisters, and/or the indicator 40 may be mounted within the vehicle cab as part of the instrument cluster 42. When a first canister registers as "empty" or when it is removed from the canister mounting, the controller 34 automatically switches to a second supply of solid ammonium in a second canister.

In another feature of an embodiment of the present system, a method for tracking the solid ammonia level in the ammonia canister 20 may be used on each canister, as illustrated in FIG. 3. That is, after a canister is removed from the vehicle's ammonia storage and delivery system, the remaining ammonia in the subject canister can be readily determined. Generally speaking, the method comprises attaching a memory storage device to each ammonia canister, determining the volume of solid ammonia in the canister, storing information relevant to the determined volume in the memory storage device and periodically updating the information on the memory storage device as the ammonia is used.

As with the system 10 previously described, the method further comprises metering the use of the ammonia after the step of storing the information. The system controller 34 previously described is suitable for such metering and information storage. However, the controller 34 remains with the vehicle when the ammonia canisters are removed and, therefore, cannot suitably operate to make such information available for a removed canister. Instead, the memory storage device 50 affixed to the ammonia canister comprises an RFID tag which can be read by a conventional RFID reader 52.

When a canister 20 is connected to the vehicle's ammonia storage and delivery system 10, an RFID reader/writer in the metering system 22 can frequently update the information stored on the RFID tag 50 as ammonia is depleted. As the controller 34 determines information about each coupled canister 20, the RFID reader/writer can easily write such information to the individual RFID tag 50 on each canister. Periodically or continuously updating the information merely comprises the steps of calculating the amount of solid ammonium remaining in the canister based on the flow rate and duration metered by the controller 34 and then storing a value relevant to the calculated amount on the memory storage device, i.e., the RFID tag 50.

In an embodiment of the canister volume tracking method, each solid ammonium canister 20 comprises a memory storage device (e.g., RFID tag) 50 affixed to the canister 20, wherein the memory storage device contains information relevant to the volume of solid ammonium stored in the canister. The vehicle components include a metering device for tracking the amount of ammonium delivered from the canister over a period of time, and an input device (e.g., RFID reader/writer) for periodically updating the memory storage device based on the amount of ammonium delivered from the canister 20 as tracked by the metering device 22. The RFID information may be provided by direct measurement of some kind or through modeling using engine and/or aftertreatment operating characteristics as data inputs, or both.

Figure 4:
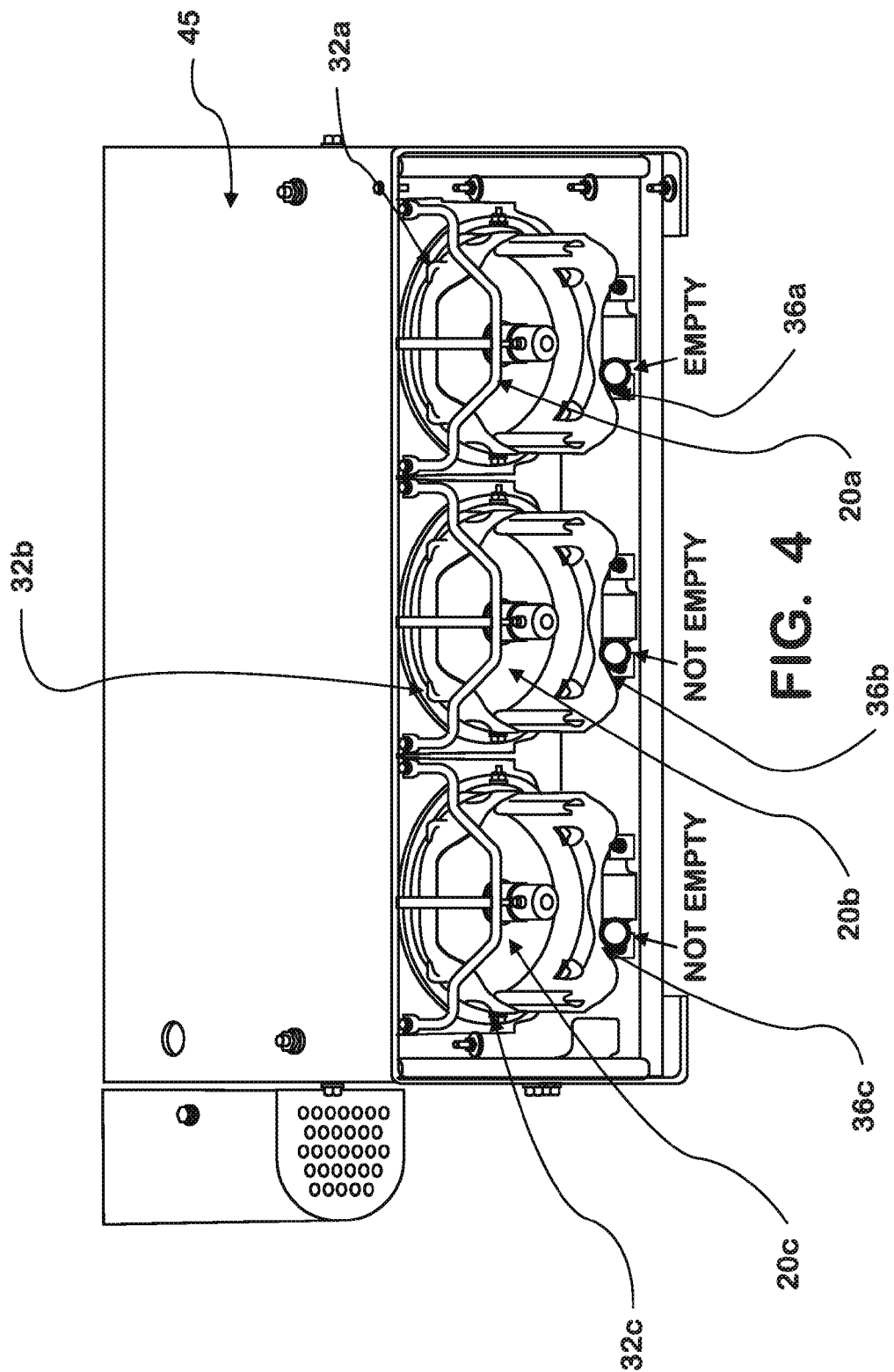
FIG. 4 is a schematic illustrating an embodiment of an indicator system housing using a three canister array.
Figure 5:
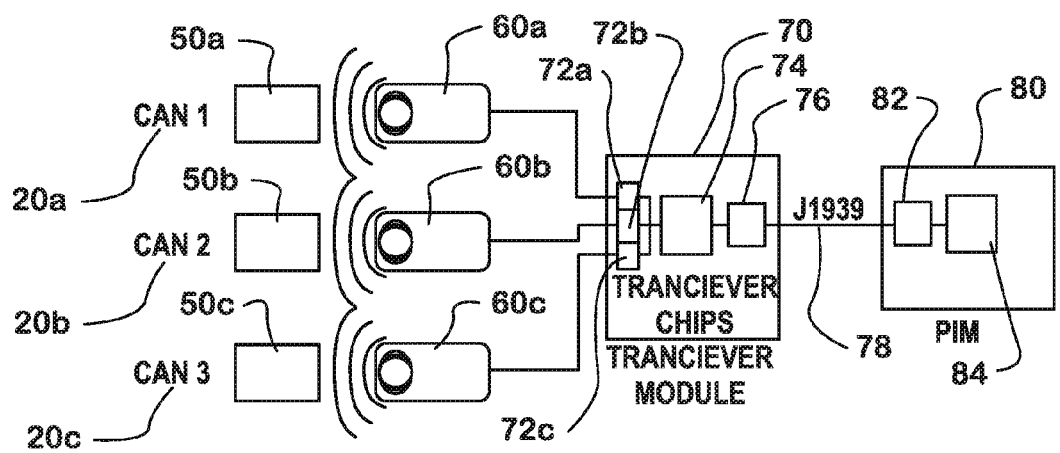
FIG. 5 is a schematic illustrating an embodiment of an RFID system for reading and writing information on the RFID tag.

FIG. 5 is a schematic of an RFID system for reading and writing information on the RFID tag or transponder 50a, 50b, 50c of an ammonia canister 20a, 20b, 20c. As shown, the illustrated system includes one or more canisters 20a, 20b, 20c, with each canister 20a, 20b, 20c having an RFID tag 50a, 50b, 50c. Further, in the illustrated embodiment, each canister 20a, 20b, 20c and RFID tag 50a, 50b, 50c combination has an associated antenna 60a, 60b, 60c, such as, for example, a first canister 20a and its RFID tag 50a being associated with a first antenna 60a. The use of separate antennas 60a, 60b, 60c may assist in identifying the physical location of the particular canister 20a, 20b, 20c that is in need of service or replacement. For example, as shown in FIG. 4, three canisters 20a, 20b, 20c may be positioned in a canister housing 45 that provides for three canister positions 32a, 32b, 32c. Each antenna 60a, 60b, 60c may be positioned to correspond to one of the three canister positions 32a, 32b, 32c in the housing 45, with the first antenna 60a being designated to read the RFID tag 50a of the canister 20a that is located in a first canister position 32a. Therefore, if the first antenna 60a delivers a signal indicating a canister 20a has an ammonia level at or below a predetermined level, the RFID system will be able to indicate and/or know the canister 20a in the first canister position 32a needs to be replaced or refilled. This indication may be provided, for example, by a visual indicator, such as an LED light 36a, 36b, 36c on or around the housing 45 or on an instrument cluster 42, or by diagnostic data, among other indicators.

Figure 6A:
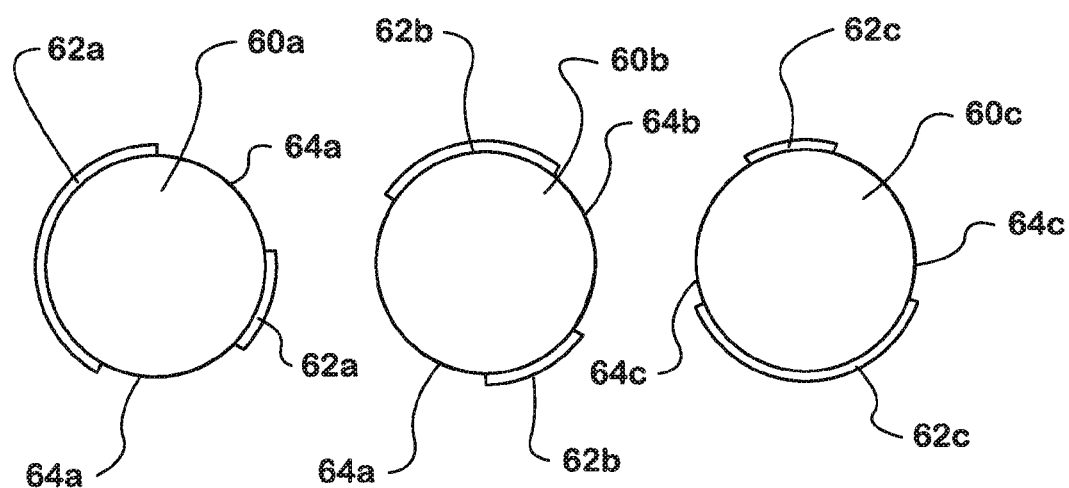
FIG. 6a is a front view of antennas having slotted outer housings.

The antennas 60a, 60b, 60c may each have a configured that allows each antenna to be positioned relative to a particular canister position 32a, 32b, 32c. For example, according to the illustrated embodiment, as shown in FIG. 6a, the antennas 60a, 60b, 60c have an outer housing 62a, 62b, 62c that may have one or more slots or groves 64a, 64b, 64c. These slots 64a, 64b, 64c may be positioned at different locations on each antenna 60a, 60b, 60c and/or have different configurations so that the configuration of each outer housing 62a, 62b, 62c is different. These differences in the outer housings 62a, 62b, 62c may be used to limit where the antennas 60a, 60b, 60c may be positioned so that each antenna 60a, 60b, 60c is positioned or aligned to receive information regarding a canister 20a, 20b, 20c that is located in a particular canister position 32a, 32b, 32c.

Figure 6B:
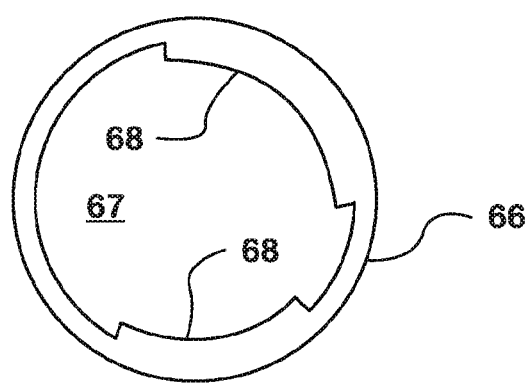

For example, FIG. 6b illustrates a first receptacle 66 configured to engage with the first antenna 60a so that the first antenna 60a is positioned to send and receive data from the RFID tag 50a of a canister 20a that is in the first canister position 32a. In this example, the first receptacle includes an aperture 67 and one or more protrusions 68. The protrusions 68 are configured to mate with the slots 64a of the first antenna 60a as at least a portion of the outer housing 62a of the first antenna 60a is inserted into the aperture 67. Further, the configuration of the protrusions 68 do not mate with the slots 64b, 64c of the second and third antennas 60b, 60c. Instead, the second and third antennas 60b, 60c may mate second and third receptacles for the second and third canister positions 32b, 32c, respectively, so that the second antenna 60b sends and receives data from the canister 20b in the second canister position, and the third antenna 20c sends to and receives data from the canister 20c in the third canister position 32c. Such configurations allow each antenna to be tied to a specific input to at least assist the system in correctly identifying the canister position 32a, 32b, 32c of a canister 20a, 20b, 20c that may require service or replacement. While this embodiment illustrates the use of slots 64a, 64b, 64c, and protrusions 68, other characteristics may be employed to ensure that each antenna 60a, 60b, 60c is positioned at its desired location relative to the canister positions 32a, 32b, 32c, including each outer housing 62a, 62b, 62c having a different shape and/or size, among other physical characteristics.

According to other embodiments, a single antenna, such as the first antenna 60a, may be used for communication with more than one canister 20a, 20b, 20c and RFID tag 50a, 50b, 50c combinations. In such embodiments, the RFID system may also include a visual indicator system similar to those previously discussed, where, based on information obtained in the RFID system, such as the tag identification number, a visual indicator is used to indicate the position or location of the canister 20a, 20b, 20c that is in need of replacement or service.

In the embodiment illustrated in FIG. 5, each antenna 60a, 60b, 60c is operably connected to a transceiver module 70. The transceiver module 70 may be positioned at a variety of different locations, including being found in the engine control unit, a gage cluster, or be a stand-alone module, among other possible locations. The transceiver module 70 may include a transceiver chip 72 and a microcontroller 74. Moreover, the transceiver module 70 may include a transceiver chip 72a, 72b, 72c for each antenna 60a, 60b, 60c. The transceiver chip 72a, 72b, 72c may decode information obtained from the RFID tag 50a, 50b, 50c through the antenna 60a, 60b, 60c, and code information that is to be written on the RFID tag 50a, 50b, 50c.

The transceiver chips 72a, 72b, 72c are operably connected to a microcontroller 74. The microcontroller 74 interfaces with the transceiver chips 72a, 72b, 72c so as to receive the decoded information from the transceiver chips 72a, 72b, 72c. Additionally, the microcontroller 74 may instruct the transceiver chips 72a, 72b, 72c as to both when data on the RFID tags 50a, 50b, 50c is to be obtained by the antenna 60a, 60b, 60c, and what information is to be decoded and sent to the RFID tags 50a, 50b, 50c.

The transceiver module 70 is operably connected to an electronics control module (ECU) 80, such as, for example, by a SAE J1939 vehicle bus. For example, the transceiver module 70 may include a control area network (CAN) bus interface 76 that is connected via a communications cable 78 to a CAN bus interface 82 in the ECU 80. As shown in FIG. 5, the microcontrollers 74, 84 of the transceiver module 70 and ECU 80 may be operably connected to their respective CAN bus interface 76, 82 so that information may be exchanged between the microcontrollers 74, 84. As discussed below in more detail, the microcontroller 84 of the ECU 80 may programed to predict or determine the level of ammonia in one or more of the canisters 20a, 20b, 20c. Further, the ECU 80 may be generally at the same, or at a different, location than the transceiver module 70, such as, for example, being in the engine control unit, a gage cluster, or being a separate module, among other locations.

Figure 7:
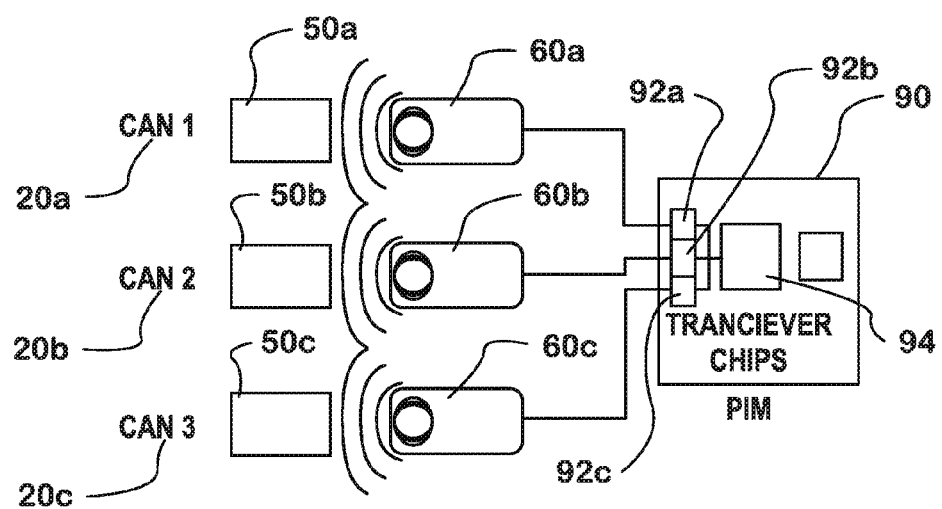
FIG. 7 is a schematic illustrating an embodiment of an RFID system for reading and writing information on the RFID tag.

FIG. 7 illustrates another embodiment in which the one or more antennas 60a, 60b, 60c are operably connected to a ECU 90. As shown, this embodiment eliminates the use of a separate transceiver module 70 and the associated CAN interfaces 76, 82 and cable 78 that are shown in the embodiment illustrated in FIG. 5. As shown in FIG. 7, the ECU 90 includes one or more transceiver chips 92a, 92b, 92c that are operably connected to the antennas 60a, 60b, 60c and a microcontroller 94. Again, as discussed below in more detail, the microcontroller 94 of the ECU 90 may be programmed to predict or determine the amount or ammonia present in in one or more of the canisters 20a, 20b.

Figure 8:
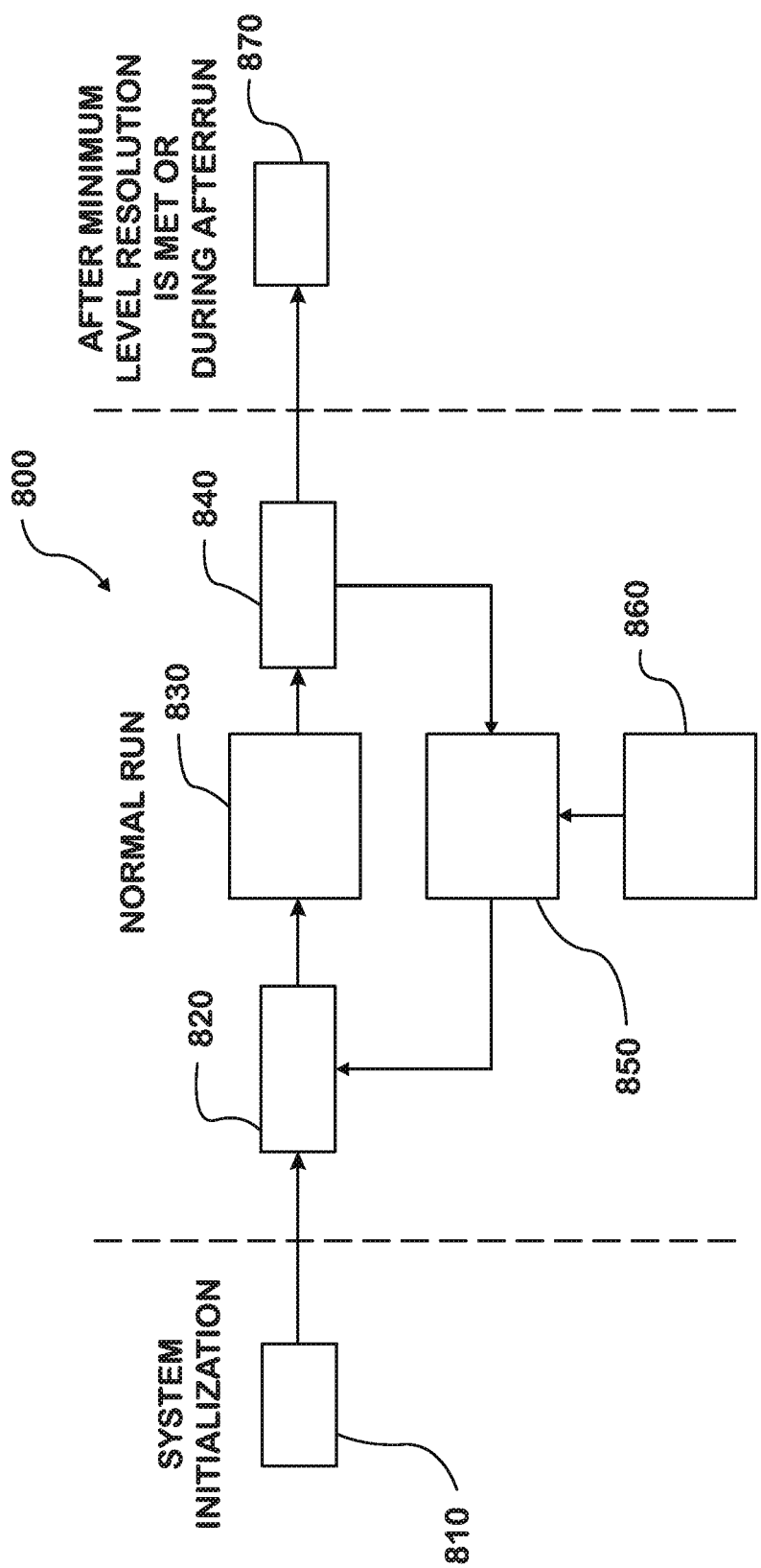
FIG. 8 is an algorithm for determining the level of solid ammonia in a canister.

FIG. 8 illustrates an algorithm 800 for tracking the solid ammonia level in an ammonia canister 20. At 810, when the system is started, such was when the engine is started or the vehicle is in a key-on position, the RFID tag 50 on the canister 20 may be read. For example, when the system is started, power may be transmitted through the antenna 60 to the RFID tag 50, and the antenna 60 may receive a signal containing data from the RFID tag 50. The signal may then be decoded by the transceiver chip 72, 92.

The data from the RFID tag 50 may include an RFID tag number, the last recorded ammonia level for the canister 20, the date(s) of filling or refilling of the canister 20, and/or the number of times the canister has been refilled, among other data. The RFID tag number may be used to determine whether a new or different canister 20 has replaced the prior canister 20, and whether the canister(s) 20 has changed canister position, such as the canister positions 32a, 32b, 32c shown in FIG. 4. The RFID tag number may also be used for inventory management of the canisters 20, including tracking the canisters 20 when they are stored for inventory and/or being refilled. The data may also be used to track the number of canister refills, in the event one wishes to limit the number of permissible refills of a given canister 20. Additionally, the RFID tag number may be used to keep a history of canisters 20 that have been used by a particular vehicle, such as, for example, the ECU 80, 90 recording the RFID tag numbers for canisters 20 that have been used by the vehicle's treatment system and the number of vehicle miles that each canister 20 was used. Similarly, the data from the RFID tag 50 may provide information identifying the vehicle(s) that the canister 20 has been used with, such as, for example, the vehicle identification numbers for the last three vehicles that have used that particular canister 20.

Additionally, an unsuccessful attempt to read information from the RFID tag 50 of a canister 20 at start-up may provide an indication that the canister 20 is missing or not present at that particular canister position. An indication of a missing canister 20 may be used to prevent other engine components from trying to heat or build pressure in the missing canister 20.

In the embodiment illustrated in FIG. 5, the decoded data from the RFID tag 50 is sent from the microcontroller 74 of the transceiver module 70 to the microcontroller 84 of the ECU 80 through the CAN interfaces 76, 82 and cable 78. For the embodiment shown in FIG. 7, the decoded data from the RFID tag 50a, 50b, 50c may be sent from the transceiver chip 92 to the microcontroller 94 of the ECU 90.

At step 820, the ammonia level read from the RFID tag 50 is recorded by the microprocessor 84, 94. Alternatively, if the RFID tag 50 provided an identifier, such as an RFID tag number, indicating that the canister 20 is the same canister 20 that was used at the time of the last write or when the engine was last shut down, the microprocessor 84, 94 may set the ammonia level at step 820 at the level that was last stored by the microprocessor 84, 94 for that particular RFIG tag 50 or canister 20. The ammonia level set at step 820 may be subsequently reset or adjusted after certain intervals or amounts of ammonia usage, also referred to as or precisions or resolutions, as discussed below.

At step 830, the amount of ammonia being used from the canister 20 is measured. For example, as previously discussed, the canister 20 may be connected to a metering system 22 for metering the flow of ammonia gas from the canister 20 to the injector. This metering information is provided to the microcontroller 84, 94 as the metering system 22 is measuring the amount of ammonia being used, after the metering system 22 has measured the use of a predetermined amount of ammonia, and/or at other intervals of ammonia usage or time.

The microcontroller 84, 94 may be configured such that, at step 840, when a predetermined amount of ammonia usage has been metered, the microcontroller 84, 94 determines a new ammonia level for the canister 20. The microcontroller 84, 94 may determine the new ammonia level by subtracting the amount of solid ammonia used from the amount of ammonia that was recorded at step 820. For example, if a full canister 20 is configured to contain 4,500 grams of ammonia and the precision level is 0.5%, the microcontroller 84, 94 may be configured to determine a new ammonia level every time the 0.5% of that original 4,500 grams of ammonia, or 22.5 grams, has been determined to have been depleted from the canister 20. Thus, according to certain embodiments, the microprocessor 84, 94 may be configured to correlate the amount of ammonia fluid metered by the metering system 22 with the amount of solid ammonia that has been depleted from the canister 20. In this example, if the 4,500 grams was the amount of ammonia set at step 820, then at step 840, the 22.5 grams of ammonia is subtracted from 4,500 grams, and the new ammonia level is determined to be 4,477.5 grams. This newly determined ammonia level may then be used to reset the ammonia level stored at step 820, or may be used in a rationality check at step 850, as discussed below. Further, the microcontroller 84, 94 may continue performing step 830 so as to determine when another precision level, in this example another 0.5% or 22.5 grams, of ammonia has been further depleted from the canister 20 so that a new ammonia level may be again calculated at step 840 using a reset ammonia level from step 820.

According to the illustrated embodiment, at step 850, the microcontroller 84, 94 may perform a rationality check. The rationality check allows for a comparison of the solid ammonia level determined at step 840 with the solid ammonia level as determined by other methods. Such a comparison may provide an indication of the accuracy of the ammonia level determined at step 840, as well as account for operational factors that may affect the ammonia level of the canister 20 that may not be taken into account by the algorithm 800, such as, for example, an ammonia leak in the metering system 22, tubing 23, and/or connector 26, among other factors.

The ammonia level in the canister 20 may be determined at step 860 in a number of alternate ways or methods. For example, the ammonia level may be determined based on changes in the weight of the canister 20. For example, the weight of the canister 20 when the ammonia level was recorded at step 820 may be compared with the present weight of the canister 20 or the canister 20 weight when the ammonia level was determined at step 840. According to another embodiment, the amount of ammonia in the canister 20 may be determined by an algorithm that relies on the temperature and pressure inside the canister 20.

At step 850, the ammonia level determined at steps 840 and 860 are compared. If the comparison indicates that the ammonia level determined at steps 840 and 860 differ by a predetermined amount or range, the microprocessor may be programmed to make a selection of which determined ammonia level (e.g. the levels determined at steps 840 or 860) to use to reset the ammonia level recorded at step 820. For example, if the ammonia level determined at step 860 is considered to be more accurate or reliable than the level determined at step 840, the microprocessor 84, 94 may be programmed to reset the ammonia level recorded at step 820 using the ammonia level determined at step 860 if the difference between the determined amounts is greater than a predetermined range or percentage, such as, for example, 10%. Following the rationality check, the microcontroller 84, 94 may reset the ammonia level recorded at step 820.

The algorithm 800 is also configured to re-write the ammonia level in the canister 20 on the RFID tag 50 at step 870. For example, in the embodiment illustrated in FIG. 8, the ammonia level may be re-written on the RFID tag 20 upon the occurrence of predetermined events, such as, for example, when the ammonia level at step 820 is reset, after the use of a predetermined amount or precision of ammonia from the canister 20, when the ammonia level determined at step 840 reaches or is below predetermined levels, and/or at certain time intervals. The timing of the writing to the RFID tag 50 may also limited to certain situations, such as when the engine speed is within a predetermined range, after certain time intervals of current and/or overall engine operation, and the temperature of (or around) the canister 20 or the RFIG tag 50, such as, for example, when the temperature of the RFID tag is below 85 degrees Celsius.

Further, the system may be configured such that the RFID tag 50 is read before the RFID tag 50 is re-written with a new or adjusted ammonia levels. Such a reading may prevent an ammonia level being recorded on an RFID tag 50 of a canister 20 that is different than the canister 20 and RFID tag 50 that was originally read at step 810. More specifically, the RFID tag 50 may provide an identifier that allows the system to determine if the RFIG tag 50 that is going to be re-written is for the same canister 20 that was last read at step 810 or last written at step 870, or if that canister 20 was replaced or switched canister position 32a, 32b, 32c. Such a check may prevent information regarding a determined ammonia level for a canister 20 being written on the RFID tag 50 of a different canister 20.

Before the canister 20 is removed from the vehicle, the memory storage device 50 is updated with current ammonia load information. A conventional handheld RFID reader 52 may then be used at canister drop-off locations to determine the fill-status of each canister 20 which has been removed from a vehicle. Alternatively, an automated RFID reader may be used, with the aftertreatment control system receiving a signal indicative of the RFID information and using this signal to determine at least in part when to switch from one canister to another.

What is claimed is:

1. A solid ammonia canister detection system comprising:
   a solid ammonium canister having stored therein a supply of solid ammonium;
   a radio frequency identification device tag associated with the cannister;
   an antenna configured to receive data from, and transmit data to, the radio frequency identification device tag;
   a transceiver chip configured to decode data received from, and code data sent to, the radio frequency identification device tag; and
   a microcontroller configured to record data received from the radio frequency identification device tag, wherein the microcontroller determines a quantity of solid ammonia that has been depleted from the canister, and wherein the microcontroller determines a quantity of solid ammonia remaining in the canister based on data from the radio frequency identification device and the quantity of solid ammonia depleted from the canister.

2. The solid ammonia canister detection system of claim 1, further including an
   additional microcontroller, the additional microcontroller configured to instruct the antenna to read data from, and write data to, the radio frequency identification device tag, the data corresponding to the quantity of solid ammonia stored in the canister.

3. The solid ammonia canister detection system of claim 2, further including a housing having a plurality of canister positions, each canister position configured to house a canister, the system further including a dedicated antenna for each canister at each canister position, the housing further including a plurality of receptacles, at least one antenna having an outer housing configured for engagement with only one of the plurality of receptacles.

* * * * *